(No Model.)

K. W. JONES.
LAND ROLLER.

No. 298,475.  Patented May 13, 1884.

Witnesses,
Geo. H. Strong.

Inventor,
K. W. Jones
Dewey & Co.
Attorneys

N. PETERS, Photo-Lithographer, Washington, D. C.

UNITED STATES PATENT OFFICE.

KINZY W. JONES, OF LEMOORE, CALIFORNIA.

LAND-ROLLER.

SPECIFICATION forming part of Letters Patent No. 298,475, dated May 13, 1884.

Application filed January 21, 1884. (No model.)

*To all whom it may concern:*

Be it known that I, KINZY W. JONES, of Lemoore, county of Tulare, and State of California, have invented new and useful Improvements in Rollers; and I do hereby declare the following to be a full, clear, and exact description thereof.

My invention relates to a new and useful roller for agricultural purposes; and it consists in the novel arrangement and combination of devices hereinafter described and claimed.

Figure 1:
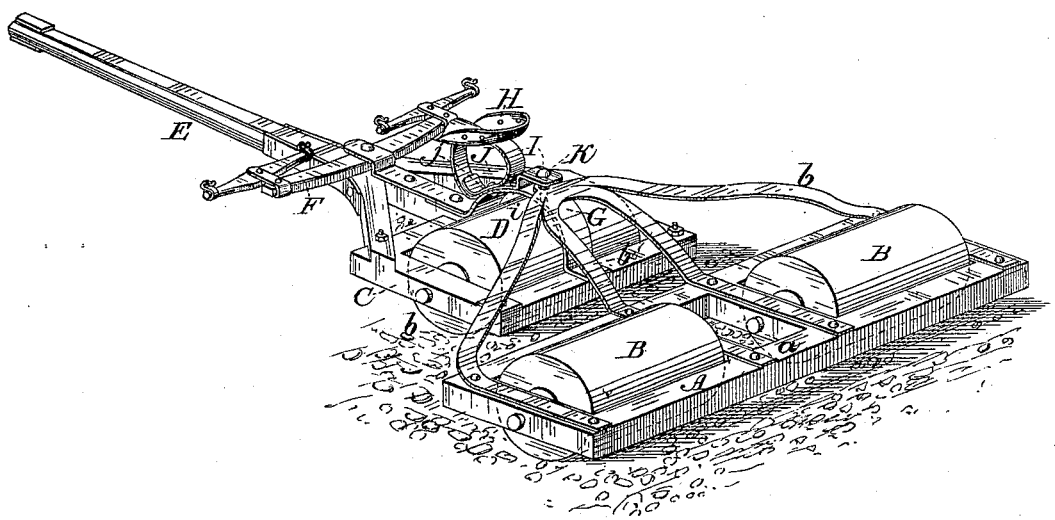
Figure 2:
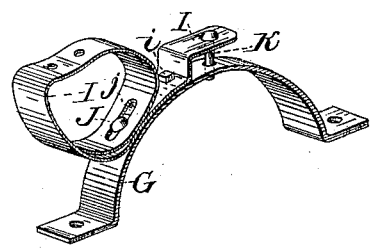

Referring to the accompanying drawings, Figure 1 is a perspective view of my roller. Fig. 2 is an enlarged view of the supporting-bar G and spring I.

A is a wide frame, in which are independently mounted the rollers B B. The united length of these is sufficiently shorter than the width of the frame to leave an open space, $a$, between their inner ends. Secured to the frame A are the arms $b$, constructed of a single piece of metal, while the forward ends of these arms are curved upward and formed with a perforation to receive the bolt K, as shown in Fig. 1.

C is the front frame, in which is mounted the roller D. This is of a length greater than the width of the space $a$ between the rear rollers B B, so that said roller D overlaps the rear rollers.

E is the tongue, secured to frame C, and F is the double-tree for the horses.

Curved over the roller D is a supporting-bar, G, the forward end of which is bolted to the tongue, and the rear to frame C.

H is the seat. The spring I for the seat consists of a single leaf curved spirally on itself, and secured to the supporting-bar G by a rivet, $i$. The inner end of the leaf is slotted at $j$, and has a movement on the lower turn of the spring, guided by a pin, J, through the slot. The rear end of the leaf is bent upward, forming a bearing between itself and the bar G, in which the forward and meeting ends of the connecting or coupling bars or arms $b$ are fitted and pivoted by a bolt, K. The spring for the seat is very simple and is easy in operation.

Having thus described my invention, what I claim as new, and desire to secure by Letters Patent, is—

1. The spring I for the seat, consisting of a single leaf, one end of which is riveted fast, and the other is curved inwardly on itself, and has a play by reason of a slot, $j$, and guide-pin J, substantially as herein described.

2. The rear frame, A, having rollers B and connecting-arms $b$, formed in one piece, in combination with the frame C, having roller D, curved bar G, seat-spring I, forming a single leaf, and having a raised rear portion, under which and over the bar G the arms $b$ are pivoted, substantially as herein described.

In witness whereof I hereunto set my hand.

KINZY W. JONES.

Witnesses:
B. K. SWEETLAND,
J. H. FOX.